US012614668B2

(12) United States Patent
Jo et al.

(10) Patent No.: US 12,614,668 B2
(45) Date of Patent: Apr. 28, 2026

(54) MULTILAYER ELECTRONIC COMPONENT WITH CONTROLLED Sn DIFFUSION IN INTERNAL ELECTRODE

(71) Applicant: SAMSUNG ELECTRO-MECHANICS CO., LTD., Suwon-si (KR)

(72) Inventors: Eui Hyun Jo, Suwon-si (KR); Jin Soo Park, Suwon-si (KR); Chul Seung Lee, Suwon-si (KR); Byung Jun Jeon, Suwon-si (KR); Hyung Jong Choi, Suwon-si (KR); Hyun Hee Gu, Suwon-si (KR); Woo Kyung Sung, Suwon-si (KR); Myung Jun Park, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 612 days.

(21) Appl. No.: 17/983,776

(22) Filed: Nov. 9, 2022

(65) Prior Publication Data

US 2023/0411074 A1 Dec. 21, 2023

(30) Foreign Application Priority Data

Jun. 15, 2022 (KR) ........................ 10-2022-0072706

(51) Int. Cl.
   *H01G 4/008* (2006.01)
   *H01G 4/30* (2006.01)
(52) U.S. Cl.
   CPC ............. *H01G 4/0085* (2013.01); *H01G 4/30* (2013.01)

(58) Field of Classification Search
   CPC ............................... H01G 4/30; H01G 4/0085
   See application file for complete search history.

(56) References Cited

U.S. PATENT DOCUMENTS 9,633,793 B2 * 4/2017 Nishisaka ................ H01G 4/30
2008/0210564 A1 * 9/2008 Motoki .................. H10N 30/50
                                                            205/122

(Continued)

FOREIGN PATENT DOCUMENTS

JP      H06-30318 B2    4/1994
JP      2016-171310 A   9/2016
        (Continued)

OTHER PUBLICATIONS

Search Report issued Jul. 10, 2023 for corresponding European Patent Application No. 22206643.3.

(Continued)

*Primary Examiner* — David M Sinclair
(74) *Attorney, Agent, or Firm* — MORGAN, LEWIS & BOCKIUS LLP

(57) ABSTRACT

A multilayer electronic component includes a body including a plurality of dielectric layers and an internal electrode including a conductive material, and an external electrode disposed on the body and connected to the internal electrode. The internal electrode includes a Sn diffusion portion including Sn in a region connected to the external electrode, and a ratio of an average number of atoms of the Sn compared to an average number of atoms of the conductive material other than the Sn of the internal electrode included in the Sn diffusion portion is 3% or more and 50% or less.

25 Claims, 11 Drawing Sheets

P

(56)           References Cited

U.S. PATENT DOCUMENTS

| | | | |
|---|---|---|---|
| 2009/0310277 A1* | 12/2009 | Kayatani | H01G 4/005 |
| | | | 29/25.42 |
| 2010/0328842 A1* | 12/2010 | Takeuchi | C25D 5/50 |
| | | | 361/301.4 |
| 2011/0149470 A1 | 6/2011 | Hur et al. | |
| 2015/0155098 A1 | 6/2015 | Yamaguchi et al. | |
| 2015/0279566 A1* | 10/2015 | Otani | H01G 4/008 |
| | | | 361/301.4 |
| 2016/0268046 A1 | 9/2016 | Nishisaka et al. | |
| 2020/0058442 A1 | 2/2020 | Cha et al. | |
| 2020/0411248 A1 | 12/2020 | Hashimoto | |
| 2022/0122770 A1 | 4/2022 | Jung et al. | |
| 2022/0139630 A1 | 5/2022 | Yamada et al. | |

FOREIGN PATENT DOCUMENTS

| | | |
|---|---|---|
| JP | 2021-009994 A | 1/2021 |
| KR | 10-2022-0052164 A | 4/2022 |

OTHER PUBLICATIONS

Office Action issued in corresponding Korean Patent Application No. 10-2022-0072706 on Nov. 27, 2025, with English translation.

* cited by examiner

FIRST
DIRECTION

SECOND
DIRECTION

THIRD
DIRECTION

I - I'

II-II'

P

20μm

10μm

10μm

20 μm

20 μm

MULTILAYER ELECTRONIC COMPONENT WITH CONTROLLED Sn DIFFUSION IN INTERNAL ELECTRODE

CROSS-REFERENCE TO RELATED APPLICATION(S)

This application claims benefit of priority to Korean Patent Application No. 10-2022-0072706 filed on Jun. 15, 2022 in the Korean Intellectual Property Office, the disclosure of which is incorporated herein by reference in its entirety.

TECHNICAL FIELD

The present disclosure relates to a multilayer electronic component.

BACKGROUND

Multilayer Ceramic Capacitors (MLCCs), multilayer electronic components, are chip-type capacitors installed on the printed circuit boards of various types of electronic products such as imaging devices including liquid crystal displays (LCD) and plasma display panels (PDP), as well as computers, smartphones and mobile phones, to charge or discharge electricity.

Such multilayer ceramic capacitors may be used as components of various electronic devices due to the small size, high capacitance, and ease of mounting thereof. As various electronic devices such as computers and mobile devices are miniaturized and have high output, demand for miniaturized and high capacitance multilayer ceramic capacitors is increasing.

On the other hand, although a plating layer is formed on the external electrode of the multilayer ceramic capacitor for ease of mounting and the like, hydrogen generated during the plating process easily penetrates into a product in which a single metal external electrode is implemented, such as a multilayer ceramic capacitor. Hydrogen entering through the external electrode penetrates into the internal electrode of the body, and when a voltage is applied, the hydrogen atoms are oxidized to emit electrons, and there is a risk that electrons may be accumulated inside the body, causing deterioration of insulation resistance.

SUMMARY

An aspect of the present disclosure is to provide a multilayer electronic component having improved reliability by disposing a Sn diffusion portion having a low hydrogen diffusion coefficient in the area in which the internal electrode and the external electrode contact, thereby preventing deterioration of insulation resistance of the internal electrode.

An aspect of the present disclosure is to provide a multilayer electronic component having improved reliability as the external electrode does not include a Sn diffusion portion.

According to an aspect of the present disclosure, a multilayer electronic component includes a body including a plurality of dielectric layers and an internal electrode including a conductive material; and an external electrode disposed on the body and connected to the internal electrode. The internal electrode includes a Sn diffusion portion including Sn in a region connected to the external electrode, and a ratio of an average number of atoms of the Sn compared to an average number of atoms of the conductive material other than Sn of the internal electrode included in the Sn diffusion portion is 3% or more and 50% or less.

According to an aspect of the present disclosure, a multilayer electronic component includes a body including a plurality of dielectric layers and an internal electrode including a conductive material; and an external electrode disposed on the body and connected to the internal electrode. The internal electrode includes a Sn diffusion portion including Sn in a region connected to the external electrode, and a layer of the external electrode that contacts the body does not include the Sn diffusion portion.

According to an aspect of the present disclosure, a multilayer electronic component includes a body including a plurality of dielectric layers and an internal electrode including a conductive material; and an external electrode disposed on the body and connected to the internal electrode. The internal electrode includes a Sn diffusion portion including Sn in a region connected to the external electrode, and an atomic ratio of the Sn to the conductive material in the Sn diffusion portion decreases in an inward direction of the body from a point where the internal electrode and the external electrode are in contact.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
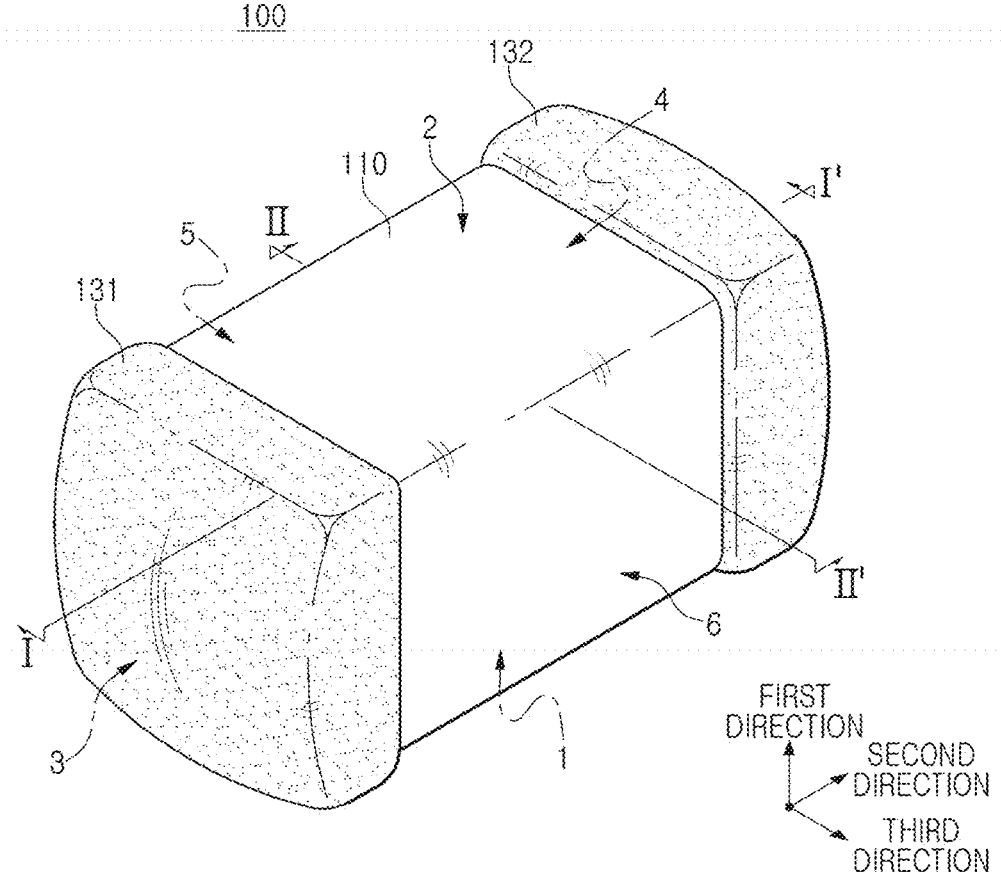
FIG. 1 schematically illustrates a perspective view of a multilayer electronic component according to an embodiment.

Hereinafter, embodiments of the present disclosure will be described with reference to specific embodiments and the accompanying drawings. However, the embodiment of the present disclosure may be modified in various other forms, and the scope of the present disclosure is not limited to the embodiments described below. Further, the embodiments of the present disclosure are provided in order to more completely describe the present disclosure to those skilled in the art. Accordingly, the shape and size of elements in the drawings may be exaggerated for a clearer description, and elements indicated by the same reference numerals in the drawings are the same elements.

To clearly describe the present disclosure in the drawings, parts irrelevant to the description are omitted. Since the size and thickness of each component illustrated in the drawings are arbitrarily indicated for convenience of description, the present disclosure is not necessarily limited to what is illustrated. In addition, components having the same function within the scope of the same concept will be described using the same reference numerals. Furthermore, throughout the specification, when a part "includes" a certain element, this means that other components may be further included without excluding other components unless otherwise stated.

In the drawings, a first direction may be defined as a stacking direction or a thickness (T) direction, a second direction may be defined as a length (L) direction, and a third direction may be defined as a width (W) direction.

Multilayer Electronic Component

FIG. 1 schematically illustrates a perspective view of a multilayer electronic component according to an embodiment.

Figure 2:
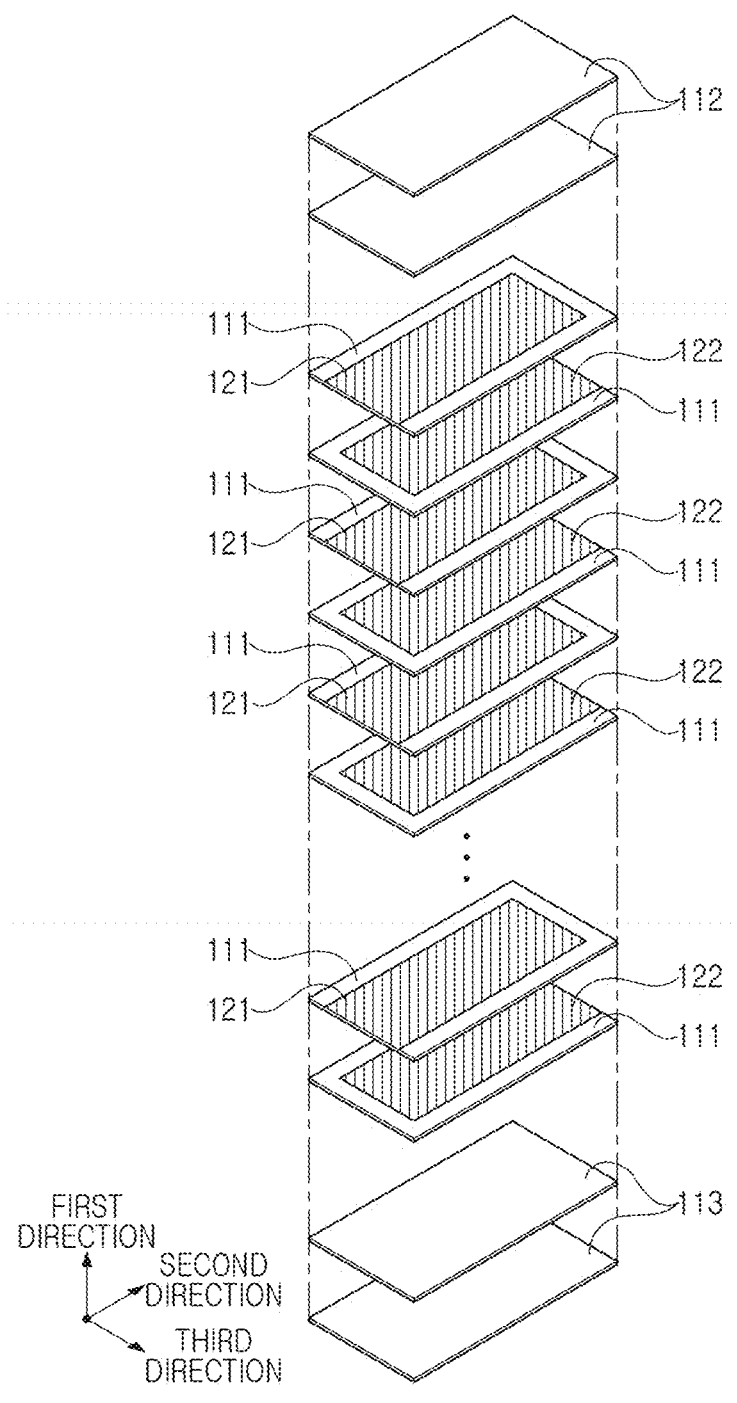
FIG. 2 is an exploded perspective view schematically illustrating a stacked structure of internal electrodes of FIG. 1.

FIG. 2 is an exploded perspective view schematically illustrating a stacked structure of the internal electrodes of FIG. 1.

Figure 3:
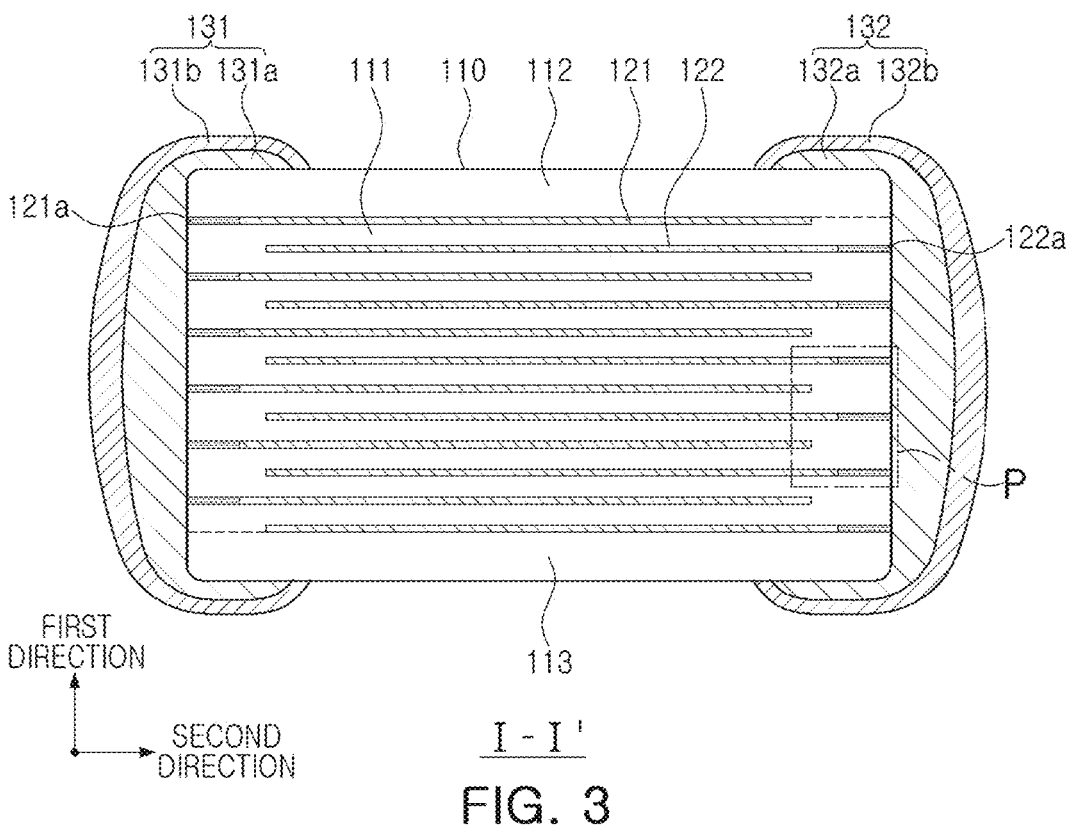
FIG. 3 schematically illustrates a cross-sectional view taken along line I-I' of FIG. 1.

FIG. 3 schematically illustrates a cross-sectional view taken along line I-I' of FIG. 1.

Figure 4:
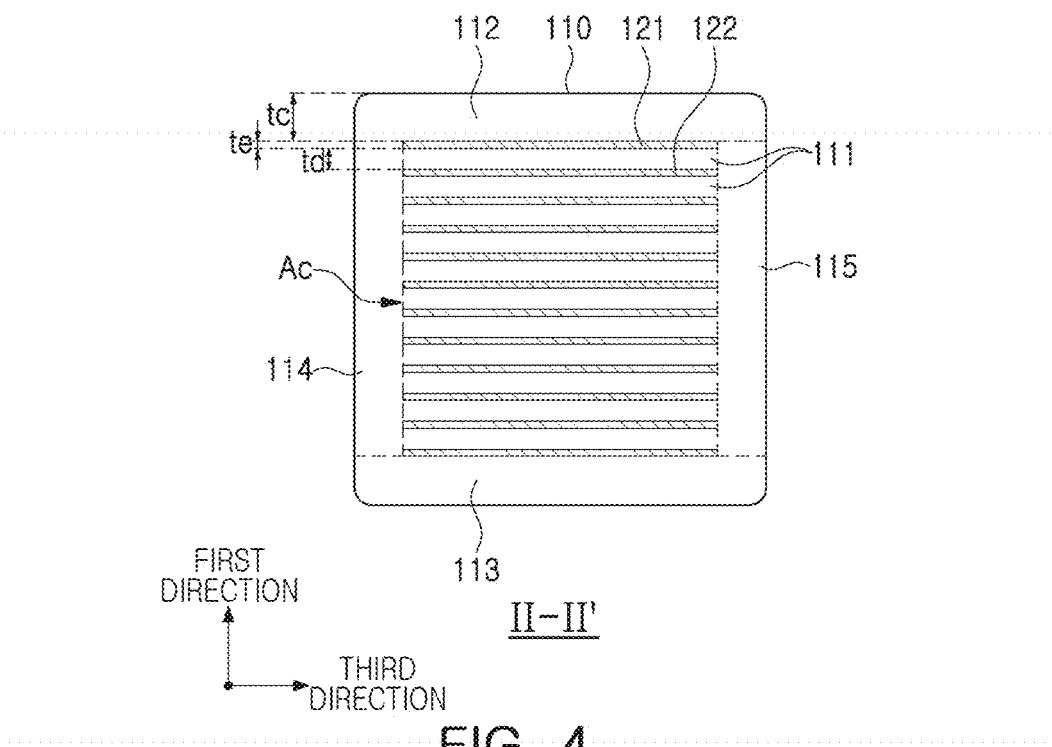
FIG. 4 schematically illustrates a cross-sectional view taken along line II-II' of FIG. 1.

FIG. 4 schematically illustrates a cross-sectional view taken along II-II' of FIG. 1.

Figure 5:
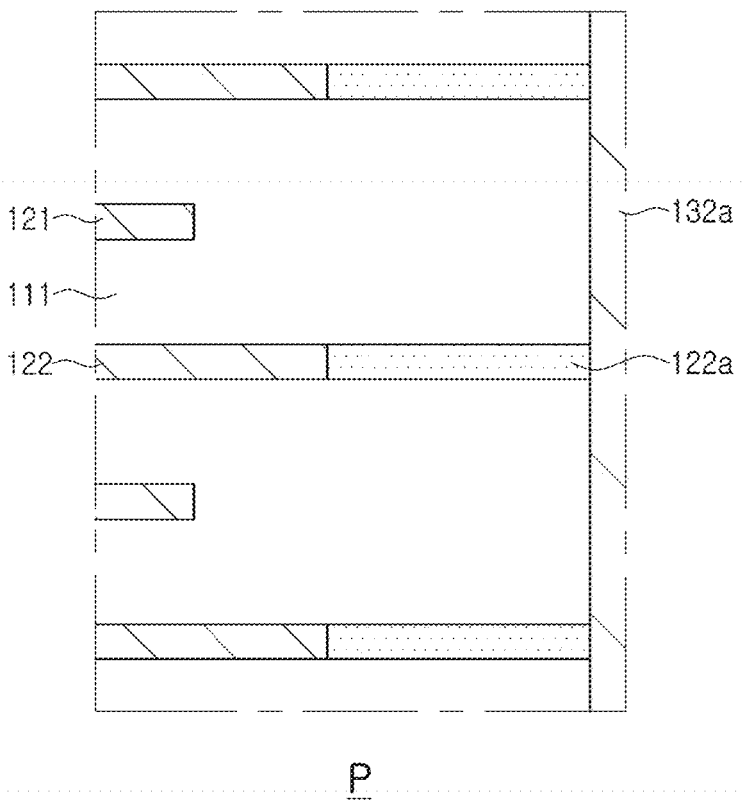
FIG. 5 schematically illustrates an enlarged view of region P of FIG. 3.

FIG. 5 schematically illustrates an enlarged view of region P of FIG. 3.

Hereinafter, a multilayer electronic component according to an embodiment will be described in detail with reference to FIGS. 1 to 5.

A multilayer electronic component 100 according to an embodiment includes a body 110 including a plurality of dielectric layers 111 and internal electrodes 121 and 122 including a conductive material; and external electrodes 131 and 132 disposed on the body 110 and connected to the internal electrodes 121 and 122. The internal electrodes 121 and 122 include Sn diffusion portions 121a and 122a containing Sn in a region connected to the external electrodes 131 and 132, and a ratio of the average number of atoms of Sn compared to the average number of atoms of the conductive material of the internal electrode included in the Sn diffusion portions 121a and 122a may be 3% or more and 50% or less.

In the body 110, the dielectric layer 111 and the internal electrodes 121 and 122 are alternately stacked.

The detailed shape of the body 110 is not particularly limited, but as illustrated, the body 110 may have a hexahedral shape or a similar shape. Due to the shrinkage of the ceramic powder included in the body 110 during the firing process, the body 110 may not have a perfectly straight hexahedral shape, but may have a substantially hexahedral shape.

The body 110 may have first and second surfaces 1 and 2 opposing each other in a first direction, third and fourth surfaces 3 and 4 connected to the first and second surfaces

1 and 2 and opposing each other in a second direction, and fifth and sixth surfaces 5 and 6 connected to the first to fourth surfaces 1, 2, 3, and 4 and opposing each other in a third direction.

The plurality of dielectric layers 111 forming the body 110 may be in a fired state, and the boundary between adjacent dielectric layers 111 may be integrated to the extent that boundaries therebetween may be difficult to determine without using a scanning electron microscope (SEM).

The body 110 may include an active portion Ac disposed inside the body 110 and including the first internal electrode 121 and the second internal electrode 122 disposed to face each other with the dielectric layer 111 interposed therebetween to form capacitance therein, and upper and lower cover portions 112 and 113 formed on both end surfaces of the active portion in the first direction, and margin portions 114 and 115 may be disposed on both end surfaces of the active portion Ac in the third direction.

The raw material for forming the dielectric layer 111 is not limited as long as sufficient capacitance may be obtained. In general, a perovskite (ABO₃)-based material may be used, for example, a barium titanate-based material, a lead composite perovskite-based material, or a strontium titanate-based material may be used. The barium titanate-based material may include BaTiO₃-based ceramic powder, and examples of ceramic powder may include BaTiO₃, (Ba₁₋ₓCaₓ)TiO₃ (0<x<1), Ba(Ti₁₋ᵧCaᵧ)O₃ (0<y<1), (Ba₁₋ₓCaₓ)(Ti₁₋ᵧZrᵧ)O₃ (0<x<1, 0<y<1) or Ba(Ti₁₋ᵧZrᵧ)O₃ (0<y<1) in which calcium (Ca), zirconium (Zr) and the like are partially dissolved in BaTiO₃, and the like.

In addition, as a raw material for forming the dielectric layer 111, various ceramic additives, organic solvents, binders, dispersants, or the like may be added to powder such as barium titanate (BaTiO₃) according to the use of the present disclosure.

On the other hand, a thickness td of the dielectric layer 111 does not need to be particularly limited.

However, to more easily obtain miniaturization and high capacitance of the multilayer electronic component, the thickness td of the dielectric layer 111 may be 0.6 μm or less, in detail, 0.4 μm or less.

In this case, the thickness td of the dielectric layer 111 may indicate the thickness td of the dielectric layer 111 disposed between the first and second internal electrodes 121 and 122.

On the other hand, the thickness td of the dielectric layer 111 may indicate an average thickness td of the dielectric layer 111.

The average thickness td of the dielectric layer 111 may be measured by scanning an image of the length and thickness direction (L-T) cross-section of the body 110 with a scanning electron microscope (SEM) with a magnification of 10,000. In detail, in the scanned image, an average value may be obtained by measuring the thickness of one dielectric layer 111 at 30 points equally spaced in the longitudinal direction. The 30 points at equal intervals may be designated in the active portion Ac. In addition, in the case in which the average value is measured by extending the measurement of the average value to ten dielectric layers 111, the average thickness td of the dielectric layer 111 may be further generalized. In this case, the average thickness td of the dielectric layer 111 may indicate the average size of the dielectric layer 111 in the first direction.

The internal electrodes 121 and 122 may be alternately stacked with the dielectric layer 111.

The internal electrodes 121 and 122 may include a first internal electrode 121 and a second internal electrode 122, and the first and second internal electrodes 121 and 122 are alternately disposed to face each other with the dielectric layer 111 constituting the body 110, interposed therebetween, and may be exposed to the third and fourth surfaces 3 and 4 of the body 110 respectively.

In detail, the first internal electrode 121 is spaced apart from the fourth surface 4 and may be exposed through (or extend from or be contact with) the third surface 3, and the second internal electrode 122 is spaced apart from the third surface 3 and may be exposed through (or extend from or be contact with) the fourth surface 4. A first external electrode 131 may be disposed on the third surface 3 of the body 110 to be connected to the first internal electrode 121, and a second external electrode 132 may be disposed on the fourth surface 4 of the body 110 to be connected to the second internal electrode 122.

For example, the first internal electrode 121 is not connected to the second external electrode 132 but is connected to the first external electrode 131, and the second internal electrode 122 is not connected to the first external electrode 131, but is connected to the second external electrode 132. In this case, the first and second internal electrodes 121 and 122 may be electrically separated from each other by the dielectric layer 111 disposed therebetween.

On the other hand, the body 110 may be formed by alternately stacking a ceramic green sheet on which the first internal electrode 121 is printed and a ceramic green sheet on which the second internal electrode 122 is printed, followed by firing.

The material for forming the internal electrodes 121 and 122 is not particularly limited, and a conductive material having excellent electrical conductivity may be used. For example, the internal electrodes 121 and 122 may include at least one of nickel (Ni), copper (Cu), palladium (Pd), silver (Ag), gold (Au), platinum (Pt), tin (Sn), tungsten (W), titanium (Ti), and alloys thereof.

In addition, the internal electrodes 121 and 122 may be formed by printing a conductive paste for internal electrodes, including at least one of nickel (Ni), copper (Cu), palladium (Pd), silver (Ag), gold (Au), platinum (Pt), tin (Sn), tungsten (W), titanium (Ti) and alloys thereof on a ceramic green sheet. As the printing method of the conductive paste for internal electrodes, a screen-printing method or a gravure printing method may be used, but the present disclosure is not limited thereto.

On the other hand, hydrogen may be generated during a plating process of forming a plating layer, which will be described later, and the hydrogen may permeate into the internal electrode. In this case, when a voltage is applied, the hydrogen penetrating into the internal electrode is oxidized to emit electrons to the dielectric layer adjacent thereto, and thus, the dielectric layer may be gradually reduced, and finally, there is a risk of problems such as deterioration of the insulation resistance.

In the case of Ni, which is generally used as a conductive material for internal electrodes, it is known that the hydrogen permeability is $10^{-11}$ m$^2$/s. In this case, when Sn (hydrogen permeability: $10^{-14}$ m$^2$/s) having a lower hydrogen diffusion coefficient than Ni is diffused in the area in which the internal electrode and the external electrode are in contact, hydrogen penetration into the internal electrode may be prevented, thereby suppressing deterioration of insulation resistance. For example, even in the case in which hydrogen, which may cause deterioration of insulation resistance, penetrates into the tip of the internal electrode through the external electrode, since the Sn diffusion portion is present in the area in which the internal electrode and the external electrode are in contact, hydrogen diffusion into the body may be reduced, and poor reliability of multilayer electronic components due to hydrogen ionization may be prevented.

Hereinafter, the Sn diffusion portions 121a and 122a will be described in more detail.

The Sn diffusion portions 121a and 122a may be formed by applying an Sn paste to the surface of the body 110 to which the internal electrodes 121 and 122 are exposed, for example, to the third and fourth surfaces 3 and 4 of the body 110, before the external electrode paste is applied on the body 110, and then performing heat treatment thereon.

The heat treatment temperature of the Sn paste may be 600° C. or higher, in detail, 700° C. or higher, but is not limited thereto, and may preferably be a temperature at which Sn diffusion from the outside of the body 110 to the internal electrodes 121 and 122 is easy, but a temperature at which heat treatment may be performed so as not to exceed the temperature that may deteriorate the reliability of the body 110.

By the heat treatment of the Sn paste, the Sn diffusion portions 121a and 122a may be formed by the diffusion in the inward direction of the body 110, for example, in the second direction (longitudinal direction) from the point where the internal electrodes 121 and 122 and the external electrodes 131 and 132 contact each other.

On the other hand, in the Sn diffusion portions 121a and 122a, the conductive material included in the internal electrode and Sn may react to form an alloy, but the present disclosure is not limited thereto, and even if the alloy is not formed, when Sn penetrates into the internal electrodes 121 and 122, the hydrogen permeation inhibitory effect may be implemented.

In this case, the contact point between the internal electrodes 121 and 122 and the external electrodes 131 and 132 may refer to a point where the dielectric material of the dielectric layer 111 and the glass of the external electrodes 131 and 132 come into contact or a line in the internal electrode layer area among the extension lines of the interface, in the adjacent dielectric layer 111 of any of the internal electrodes 121 and 122.

Figure 7A:
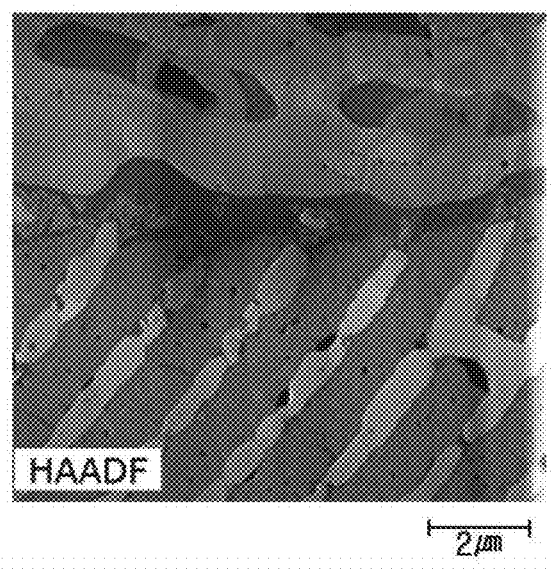
FIGS. 7A and 7B are images taken in a HAADF mode of a Sn diffusion portion according to an embodiment.
Figure 7B:
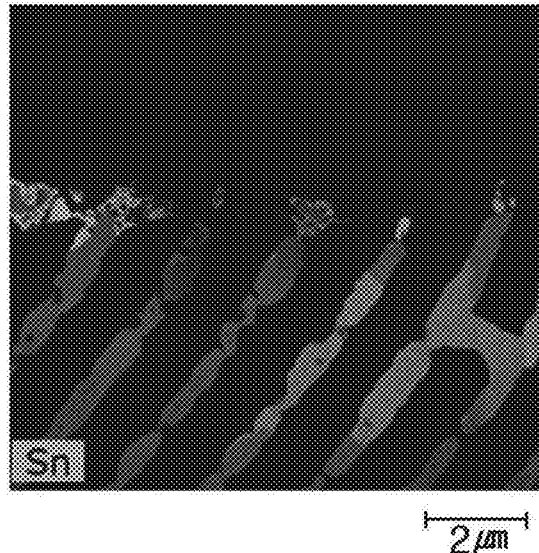
Figure 8A:
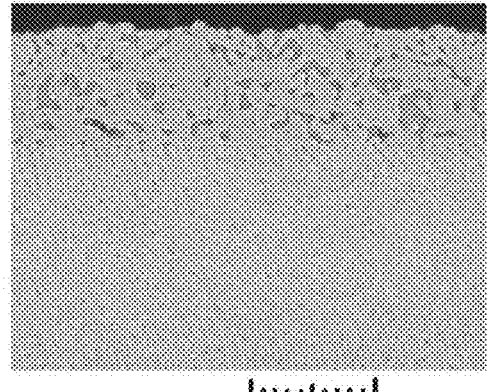
FIG. 8A is an SEM image of a comparative example in which a Sn diffusion portion is not formed.
Figure 8B:
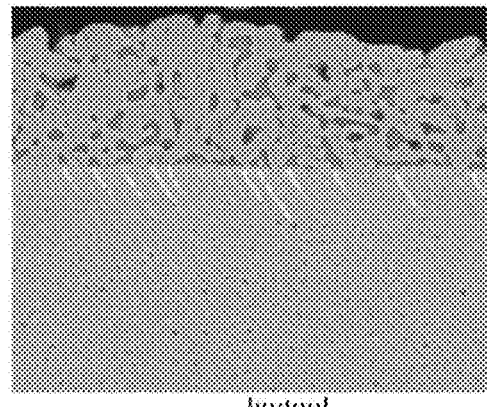
FIGS. 8B and 8C are SEM images of a comparative example in which a Sn diffusion portion is formed.
Figure 8C:
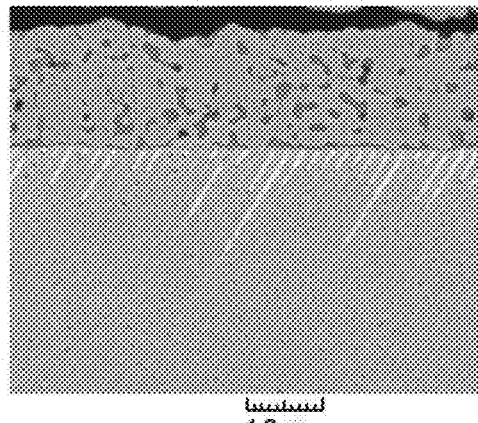

In more detail, referring to FIGS. 7A and 7B, among a plurality of layers that are repeatedly spaced apart and have different contrasts, a region in which Sn is detected corresponds to an internal electrode layer, and a region in which Sn is not detected corresponds to the dielectric layer. For example, the internal electrode layer in which Sn is detected and the dielectric layer in which Sn is not detected are alternately stacked. On the other hand, glass may be distributed at an interface other than the internal electrode layer in regions in contact with the dielectric layer. In this case, the point where the dielectric layer and the glass come into contact or a line passing through the region of the internal electrode layer in the extension line of the interface may be defined as a point or an interface where the internal electrode and the external electrode contact each other.

In another method to define the point or interface where the internal and external electrodes meet, among the extension lines provided by extending the line connecting the center of the interface between the arbitrary dielectric layer and the glass and the center of the interface between the dielectric layer adjacent to the arbitrary dielectric layer and the glass, a line passing through an internal electrode layer region disposed between the arbitrary dielectric layer and an adjacent dielectric layer may be defined as a point or an interface where the internal electrode and the external electrode contact each other. On the other hand, in relation to the extension line connected between the dielectric layers, when glass is not included, the extension line may be defined as an extended line of a line that connects the center points of the second direction ends of an arbitrary dielectric layer and an adjacent dielectric layer.

In detail, referring to FIGS. 3 and 5, the Sn diffusion portions 121a and 122a may include a first Sn diffusion portion 121a included in the first internal electrode 121, and a second Sn diffusion portion 122a included in the second internal electrode 122. For example, the first Sn diffusion portion 121a may be disposed in the first internal electrode 121, in a region adjacent to the third surface 3 of the body 110, in which the first internal electrode 121 and the first external electrode 131 are in contact, and the second Sn diffusion portion 122a may be disposed in the second internal electrode 122 in a region adjacent to the fourth surface 4 of the body 110, in which the second internal electrode 122 and the second external electrode 132 are in contact. Unless otherwise limited herein, the Sn diffusion portions 121a and 122a will be described including the first Sn diffusion portion 121a and the second Sn diffusion portion 122a.

In this case, the average number of atoms of the Sn element included in the Sn diffusion portions 121a and 122a may be 3% or more and 50% or less compared to the average number of atoms of the conductive material included in the internal electrodes 121 and 122.

In this case, the conductive material included in the internal electrodes 121 and 122 may indicate a main component among the conductive materials of the internal electrodes 121 and 122, and in detail, may refer to a conductive material occupying the largest molar ratio among conductive materials other than Sn included in the Sn diffusion portions 121a and 122a.

On the other hand, since Sn may be formed inside the body 110, for example, in the internal electrodes 121 and 122 by diffusion, the element content or the number of atoms of Sn may gradually decrease, from the point where the internal electrodes 121 and 122 and the external electrodes 131 and 132 are in contact, toward the inside of the body 110, but the present disclosure is not limited thereto. For example, by controlling the amount of Sn applied to the body 110, the heat treatment temperature, and the like, the content of the Sn element at the point where the internal electrodes 121 and 122 and the external electrodes 131 and 132 are in contact may be substantially the same as the content of the Sn element diffused into the body 110.

In this case, the average elemental content or the number of atoms of Sn may indicate an average value measured several times at a predetermined depth from a point where the internal electrodes 121 and 122 and the external electrodes 131 and 132 come into contact, among the internal electrodes 121 and 122 or the Sn diffusion portions 121a and 122a. In more detail, the average elemental content or number of atoms of Sn may refer to the average of values obtained by measuring the Sn element content or atomic percentage (Si/Ni at %) at a specific depth at the center of the contact point (or interface) between the internal electrodes 121 and 122 or the Sn diffusion portions 121a and 122a and the external electrodes 131 and 132 and measuring the Sn element content or atomic percentage (Si/Ni at %) at a point 0.1 μm apart from the same depth point of the Sn diffusion portion. In this manner, measuring at more points may be preferable.

In addition, when Sn diffused in the inward direction of the body 110 is uniformly penetrated into the plurality of internal electrodes 121 and 122 or Sn is diffused deeply into any one internal electrode 121, 122, the hydrogen permeation inhibitory effect may be implemented, but the present disclosure is not limited thereto. When the Sn diffusion portions 121a and 122a are formed in the internal electrodes 121 and 122, a hydrogen permeation inhibiting effect may be implemented.

If the average number of atoms of the Sn element included in the Sn diffusion portions 121a and 122a is less than 3% compared to the average number of atoms of the conductive material included in the internal electrodes 121 and 122, the Sn diffusion to the internal electrodes 121 and 122 is not sufficient, and thus, the hydrogen permeation inhibitory effect may be inferior, and if it exceeds 50%, there is a fear that reliability may be lowered as Sn is connected between the adjacent internal electrodes 121 and 122.

Figure 6A:
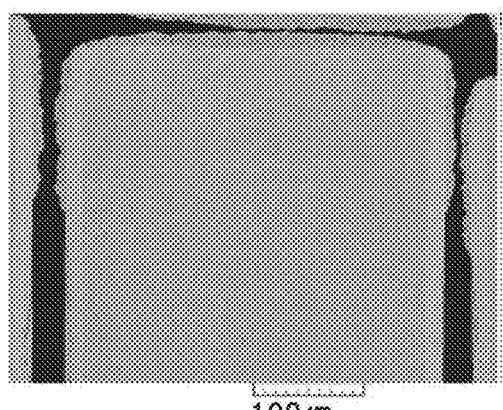
FIGS. 6A to 6C are SEM images of a region in which an internal electrode and an external electrode contact each other according to an embodiment.
Figure 6B:
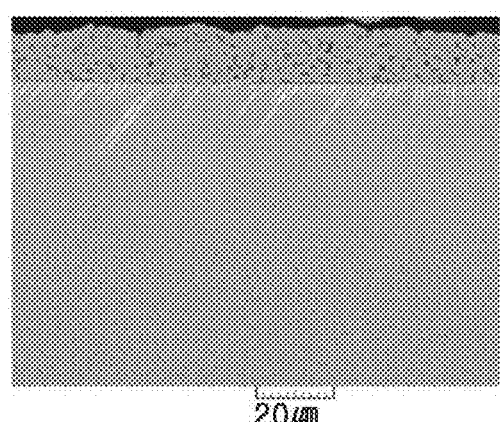
Figure 6C:
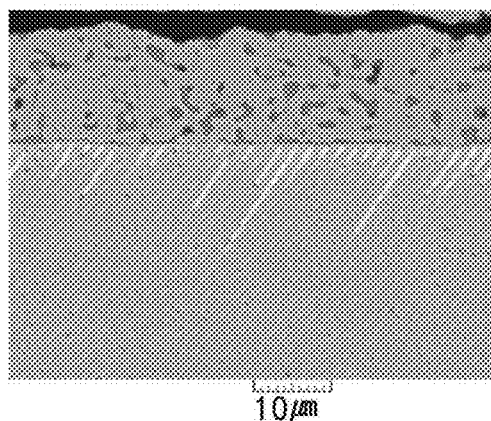

On the other hand, FIGS. 6A to 6C are SEM images in which the Sn diffusion portions 121a and 122a are formed in the internal electrodes 121 and 122. Referring to FIGS. 6A to 6C, in an embodiment of the present disclosure, the size of the Sn diffusion portions 121a and 122a in the inward direction (second direction) of the body 110 from the point where the internal electrodes 121 and 122 and the external electrodes 131 and 132 come into contact may be 1 μm or more and 30 μm or less. For example, the Sn diffusion portions 121a and 122a may have a length of 1 μm or more and 30 μm or less.

Figure 11A:
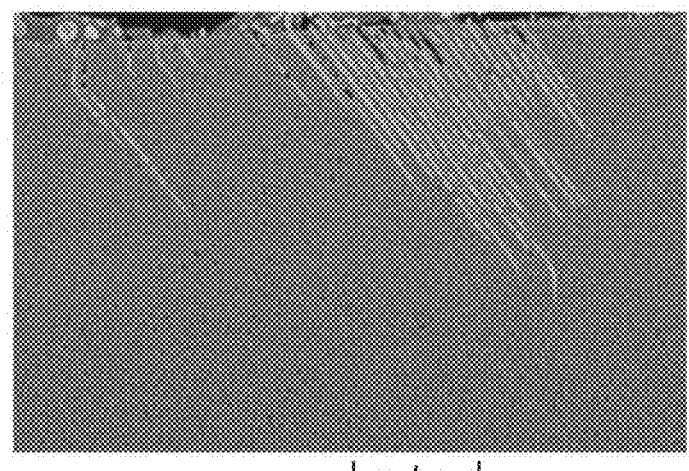
FIG. 11A is an SEM image of an excessively deep Sn diffusion portion.
Figure 12:
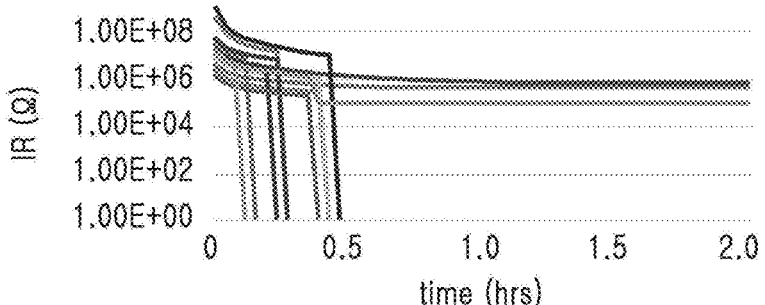
FIG. 12 is a graph of moisture resistance of the same comparative example as that of FIG. 11B.

If the length of the Sn diffusion portions 121a and 122a is less than 1 μm, the hydrogen permeation inhibitory effect may be inferior, and if the length exceeds 30 μm, pores are generated and reliability may be reduced. Referring to FIG. 11A, it can be confirmed that pores are generated due to excessively deep diffusion of Sn into the internal electrode, and in a case in which pores are generated, the hydrogen permeation effect may be inferior. Referring to FIG. 12 in which the moisture resistance reliability of the same comparative example is evaluated, it can be confirmed that the breakdown of the insulation resistance occurred in a plurality of sample chips within a relatively quick time (about 30 minutes), and a more detailed comparison with the example will be described later.

On the other hand, at a point 1 μm in the inward direction of the body 110 from the point where the internal electrodes 121 and 122 and the external electrodes 131 and 132 are in contact, the average number of atoms of Sn relative to the average number of atoms of the conductive material of the internal electrodes included in the Sn diffusion portions 121a and 122a may be 30% or more and 50% or less.

In addition, at a point 5 μm in the inward direction of the body 110 from the point where the internal electrodes 121 and 122 and the external electrodes 131 and 132 are in contact, the average number of atoms of Sn relative to the average number of atoms of the conductive material of the internal electrodes included in the Sn diffusion portions 121a and 122a may be 15% or more and 30% or less.

In addition, in the region of 10 μm or more and 30 μm or less in the inward direction of the body 110 from the point where the internal electrodes 121 and 122 and the external electrodes 131 and 132 are in contact, the average number of atoms of Sn relative to the average number of atoms of the conductive material of the internal electrodes included in the Sn diffusion portions 121a and 122a may be 3% or more and 10% or less.

If the average number of atoms of Sn compared to the average number of atoms of the conductive material of the internal electrodes included in the Sn diffusion portions 121a and 122a at the above point or region is less than the lower limit, the hydrogen permeation inhibitory effect may be inferior, and if exceeding the upper limit, there is a risk that the reliability may be lowered.

Figure 11B:
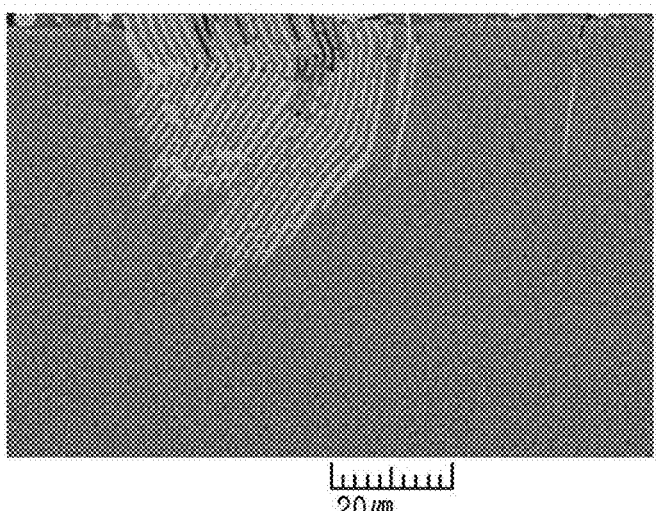
FIG. 11B is an SEM image of a Sn diffusion portion containing excessive Sn.

In detail, FIG. 11B is an SEM image of a Sn diffusion portion containing excessively Sn. It can be confirmed that pores are generated and that the adjacent internal electrodes are connected. In this case, reliability may be poor such as a short defect between the internal electrodes.

The average number of atoms of the conductive material of the internal electrodes included in the Sn diffusion portions 121a and 122a or the average number of atoms of Sn therein may be measured at the same point (depth) where the Sn diffusions 121a and 122a are formed, for example, 1 μm, 5 μm, or 10 μm or more and 30 μm, by measuring each element through EDS analysis, and this measured value may be a value averaged by extending 5 Sn diffusion portions 121a and 122a, and averaging measurement values at more points may be preferable.

On the other hand, the thickness to of the internal electrodes 121 and 122 does not need to be particularly limited.

However, to more easily obtain miniaturization and high capacitance of the multilayer electronic component, the thickness te of the internal electrodes 121 and 122 may be 0.6 μm or less, in detail, 0.4 μm or less.

On the other hand, the thickness te of the internal electrodes 121 and 122 may indicate an average thickness of the internal electrodes 121 and 122.

The average thickness te of the internal electrodes 121 and 122 may be measured by scanning an image of the length and thickness direction (L-T) cross section of the body 110 with a scanning electron microscope (SEM) with a magnification of 10,000. In detail, the average value may be measured by measuring the thicknesses of one of the internal electrodes 121 and 122 at 30 points equally spaced in the longitudinal direction in the scanned image. The 30 points at equal intervals may be designated in the active portion Ac. In addition, when the average value is measured by extending the measurement of the average value to ten internal electrodes 121 and 122, the average thickness of the internal electrodes 121 and 122 may be further generalized. In this case, the average thickness te of the internal electrodes 121 and 122 may indicate the average size of the internal electrodes 121 and 122 in the first direction.

The cover portions 112 and 113 may include an upper cover portion 112 disposed on the active portion Ac in the first direction, and a lower cover portion 113 disposed below the active portion Ac in the first direction.

The upper cover portion 112 and the lower cover portion 113 may be formed by stacking a single dielectric layer 111 or two or more dielectric layers 111 on the upper and lower surfaces of the active portion Ac in the first direction, respectively, and may basically serve to prevent damage to the internal electrodes 121 and 122 due to physical or chemical stress.

The upper cover portion 112 and the lower cover portion 113 do not include the internal electrodes 121 and 122 and may include the same material as the dielectric layer 111. For example, the upper cover portion 112 and the lower cover portion 113 may include a ceramic material, for example, a barium titanate (BaTiO$_3$)-based ceramic material.

A thickness tc of the cover portions 112 and 113 does not need to be particularly limited. However, to more easily obtain miniaturization and high capacitance of the multilayer electronic component, the thickness tc of the cover portions 112 and 113 may be 30 μm or less, in detail, 20 μm or less in an ultra-small product.

In this case, the thickness tc of the cover portions 112 and 113 may indicate an average thickness tc of the cover portions 112 and 113.

The average thickness tc of the cover portions 112 and 113 may be measured by scanning an image of the length and thickness direction (L-T) cross-section of the body 110 with a scanning electron microscope (SEM) with a magnification of 10,000. In detail, the average thickness tc may be an average value obtained by measuring the thickness of one cover portion 112, 113 at ten points equally spaced in the longitudinal direction in the scanned image. The ten points at equal intervals may be designated in the upper cover portion 112. In addition, when the average value is measured by extending the measurement of the average value to the lower cover portion 113, the average thickness tc of the cover portions 112 and 113 may be further generalized. In this case, the average thickness tc of the cover portions 112 and 113 may indicate the average size of the cover portions 112 and 113 in the first direction.

The margin portions 114 and 115 may include a first margin portion 114 disposed on the fifth surface 5 of the body 110, and a second margin portion 115 disposed on the sixth surface 6 of the body 110. For example, the margin portions 114 and 115 may be disposed on both end surfaces of the body 110 in the third direction.

As illustrated, the margin portions 114 and 115 may indicate regions between the three-direction both ends of the first and second internal electrodes 121 and 122 and the boundary surface of the body 110, based on the thickness and width (W-T direction) cross-section of the body 110.

The margin portions 114 and 115 may basically serve to prevent damage to the internal electrodes 121 and 122 due to physical or chemical stress.

The margin portions 114 and 115 may be formed by forming the internal electrodes 121 and 122 by applying a conductive paste on the ceramic green sheet except where the margin portions 114 and 115 are to be formed. As described above, to suppress the step difference caused by the internal electrodes 121 and 122, the body may be cut in such a manner that the internal electrodes 121 and 122 are exposed to the fifth and sixth surfaces 5 and 6 of the body 110 after stacking. Then, a single dielectric layer 111 or two or more dielectric layers 111 may be stacked on both sides of the active portion Ac in the width direction to form the margin portions 114 and 115.

The widths of the first and second margin portions 114 and 115 do not need to be particularly limited. However, to more easily obtain miniaturization and high capacitance of the multilayer electronic component 100, the widths of the first and second margin portions 114 and 115 may be 30 μm or less, in detail, 20 μm or less in an ultra-small product.

In this case, the width of the margin portions 114 and 115 may indicate the average width of the margin portions 114 and 115.

The average width of the margin portions 114 and 115 may be measured by scanning an image of the thickness and width direction (W-T) cross-section of the body 110 with a scanning electron microscope (SEM) with a magnification of 10,000. In detail, the average width may be an average value obtained by measuring the widths of one margin portion 114 and 115 at ten equally spaced points in the thickness direction in the scanned image. The ten points at equal intervals may be designated in the first margin portion 114. In addition, if the average value is measured by extending the measurement of the average value to the second margin 115, the average width of the margin portions 114 and 115 may be further generalized. In this case, the average width of the margin portions 114 and 115 may indicate an average size of the margin portions 114 and 115 in the third direction.

In an embodiment of the present disclosure, a structure in which the ceramic electronic component 100 has two external electrodes 131 and 132 is described, but the number and shape of the external electrodes 131 and 132, and the like, may vary depending on the form of the internal electrodes 121 and 122 or other uses.

The external electrodes 131 and 132 may be disposed on the body 110 to be connected to the internal electrodes 121 and 122.

In detail, the external electrodes 131 and 132 may include first and second external electrodes 131 and 132 disposed on the third and fourth surfaces 3 and 4 of the body 110, respectively, and connected to the first and second internal electrodes 121 and 122, respectively.

On the other hand, the external electrodes 131 and 132 may be formed of any material as long as the material has electrical conductivity, such as metal or the like, and a detailed material thereof may be determined in consideration of electrical characteristics, structural stability and the like, and further, may have a multilayer structure.

For example, the external electrodes 131 and 132 may include electrode layers 131a and 132a disposed on the body 110, and plating layers 131b and 132b disposed on the electrode layers 131a and 132a.

As a more detailed example of the electrode layers 131a and 132a, the electrode layers 131a and 132a may be fired electrodes including conductive metal and glass, or resin-based electrodes including conductive metal and resin.

In addition, the electrode layers 131a and 132a may be in a form in which a fired electrode and a resin-based electrode are sequentially formed on the body 110. Also, the electrode layers 131a and 132a may be formed by transferring a sheet including a conductive metal onto the body 110 or by transferring a sheet including a conductive metal onto the fired electrode.

As the conductive metal included in the electrode layers 131a and 132a, a material having excellent electrical conductivity may be used. For example, the conductive metal may be at least one of nickel (Ni), copper (Cu), and alloys thereof, but is particularly limited thereto.

In an embodiment, the external electrodes 131 and 132 may not include the Sn diffusion portions 121a and 122a.

In detail, it may be preferable that the Sn diffusion portions 121a and 122a are not disposed in the electrode layers 131a and 132a, which are regions in which the internal electrodes 121 and 122 and the external electrodes 131 and 132 are in contact.

If the Sn diffusion portions 121a and 122a remain on the outside of the body, it is difficult to uniformly apply the external electrode paste, and thus, pores or cracks may occur more easily and the penetration of external moisture or the plating solution may be facilitated, thereby reducing the reliability of the multilayer electronic component and reducing the adhesion between the body 110 and the external electrodes 131 and 132.

After the Sn paste is applied to the body and then heat-treated to diffuse into the internal electrodes, it may be preferable to remove the residual Sn using a sand blasting method. By removing the residual Sn, the external electrode paste may be uniformly applied, thereby preventing the formation of pores or the like without reducing the bonding force between the external electrode and the body, and thus, improving the reliability of the multilayer electronic component. As a method of removing residual Sn, a sand blasting method may be used, but the method is not limited thereto, and any method may be used as long as it does not apply an excessive impact to the multilayer electronic component or reduce reliability.

Referring to FIG. 7B illustrating a FE-SEM image in an embodiment of the present disclosure, it can be seen that the internal electrodes 121 and 122 include Sn diffusion portions 121a and 122b in the region in which the internal electrodes 121 and 122 and the external electrodes 131 and 132 are in contact with each other, but almost no Sn diffusion portions 121a and 122b remain in the external electrodes 131 and 132. Therefore, it can be seen that no pores are generated in the external electrodes 131 and 132.

The plating layers 131b and 132b serve to improve mounting characteristics, and may be disposed on the electrode layers 131a and 132a including a conductive metal or a fired electrode.

The type of the plating layers 131b and 132b is not particularly limited, and may be a single layer of the plating layers 131b and 132b including at least one of nickel (Ni), tin (Sn), palladium (Pd), and alloys thereof, and may be formed of a plurality of layers.

As a more detailed example of the plating layers 131b and 132b, the plating layers 131b and 132b may be a Ni plating layer or a Sn plating layer, and may be in the form in which the Ni plating layer and the Sn plating layer are sequentially formed on the electrode layers 131a and 132a, and may be in the form in which the Sn plating layer, the Ni plating layer, and the Sn plating layer are sequentially formed. In addition, the plating layers 131b and 132b may include a plurality of Ni plating layers and/or a plurality of Sn plating layers.

The size of the multilayer electronic component 100 does not need to be particularly limited.

However, to simultaneously obtain miniaturization and high capacitance, it is necessary to increase the number of stacks by relatively reducing the thickness of the dielectric layer and the internal electrode. Therefore, in the multilayer electronic component 100 having a size of 0402 (length× width, 0.4 mm×0.2 mm) or less, the effect of improving reliability, capacitance per unit volume and insulation resistance due to inhibition of hydrogen permeation may be more significant.

Hereinafter, the present disclosure will be described in more detail through examples, but these are intended to help a specific understanding of the present disclosure and the scope of the present disclosure is not limited to the examples.

In detail, an example of the present disclosure and a comparative example will be described in detail with reference to FIGS. 8A to 12.

EXAMPLE

Table 1 below corresponds to data obtained by measuring the number of Sn atoms for each depth of the Sn diffusion portion. The measurement depth (measurement point) at which Sn was measured in the Sn diffusion portion was measured at arbitrary points of 1 μm, 5 μm, and 10 μm or more in the inward direction of the body from the point where the internal electrode and the external electrode were in contact, and % means the percentage (%) of the number of moles of the Sn element relative to the number of moles of the Ni element included in the internal electrode (Sn/Ni %).

TABLE 1

| Measurement point | Sn/Ni at 1 μm (at %) | Sn/Ni at 5 μm (at %) | Sn/Ni at 10 μm or more (at %) |
|---|---|---|---|
| 1 | 30.2 | 18.0 | 3.6 |
| 2 | 31.0 | 16.1 | 3.3 |
| 3 | 45.4 | 24.5 | 4.2 |
| 4 | 46.0 | 28.1 | 8.1 |
| 5 | 36.2 | 20.5 | 7.0 |
| 6 | 38.1 | 19.8 | 6.1 |
| 7 | 45.0 | 16.8 | 3.4 |
| 8 | 39.5 | 17.5 | 5.0 |
| 9 | 43.2 | 15.5 | 4.7 |
| 10 | 42.8 | 15.1 | 6.1 |
| Average | 39.7 | 19.2 | 5.2 |

Referring to Table 1, in the region in which the Sn diffusion portion is formed, it can be confirmed that the Sn atomic percentage at a point of 1 μm in the inward direction of the body from the point where the internal electrode and the external electrode are in contact is 30 at % or more and 50 at % or less, and the average Sn atomic percentage corresponds to 39.7 at %. It can be seen that the Sn atomic percentage at the 5 μm point is 15 at % or more and 30 at % or less, and the average Sn atomic percentage corresponds to 19.2 at %. It can be confirmed that at any point of 10 μm or more, the Sn atomic percentage is 3 at % or more and 10 at % or less, and the average atomic percentage corresponds to 5.2 at %.

In the following, examples satisfying the numerical range of the present disclosure as illustrated in [Table 1], for example, the moisture resistance reliability evaluation of the multilayer electronic component including the Sn diffusion portion will be described in detail, the Sn diffusion portion satisfying that the average atomic percentage of Sn at a measurement depth of 1 μm is 30 at % or more and 50 at % or less, the average atomic percentage of Sn at a measurement depth of 5 μm is 15 at % or more and 30 at % or less, the average atomic percentage of Sn at a measurement depth of 10 μm or more is 3 at % or more and 10 at % or less.

Comparative Example 1 (FIGS. 8A, 9A, and 10A) corresponds to a multilayer electronic component to which a Ni internal electrode and a Cu external electrode of the related art are applied, in which the Sn diffusion portion is not formed.

Comparative Example 2 (FIG. 11A) corresponds to a multilayer electronic component in which the Sn diffusion portion is formed, but is excessively deeply diffused into the internal electrode. The rest of the configurations is the same as in Comparative Example 1.

Comparative Example 3 (FIGS. 11B and 12) corresponds to a multilayer electronic component in which a Sn diffusion portion is formed, but the connection between the internal electrodes occurs due to excessive diffusion of Sn. The rest of the configuration is the same as in Comparative Example 1.

In Example 1 (FIG. 8B, FIG. 9B, FIG. 10B), Sn paste was applied to the surface of the body to which the internal electrode was exposed, and after heat treatment at 660° C., the residual Sn was removed by sand blasting, and the Cu external electrode was formed. The rest of the configuration is the same as in Comparative Example 1.

In Example 2 (FIG. 8C, FIG. 9C, FIG. 10C), Sn paste was applied to the surface of the body to which the internal electrode was exposed, and after heat-treated at 730° C., residual Sn was removed by sandblasting, and the Cu external electrode was formed. The rest of the configuration is the same as in Comparative Example 1.

For Comparative Examples and Examples, severe hydrogen charging was performed, and Highly Accelerated Life Test (HALT) and moisture resistance reliability experiment were performed on the samples having subjected to severe hydrogen charging.

For severe hydrogen charging, the sample to be evaluated is located on the reducing electrode in a water bath containing 0.01 M NaOH, and platinum is located on the oxidizing electrode. Thereafter, hydrogen is generated by the reduction electrode by proceeding for 60 minutes at a voltage condition of 3.5V to 4.0V and a current condition of 0.03 A.

Thereafter, the samples of Comparative Example and Example subjected to severe hydrogen charging are evaluated for HALT and moisture resistance reliability.

Figure 9A:
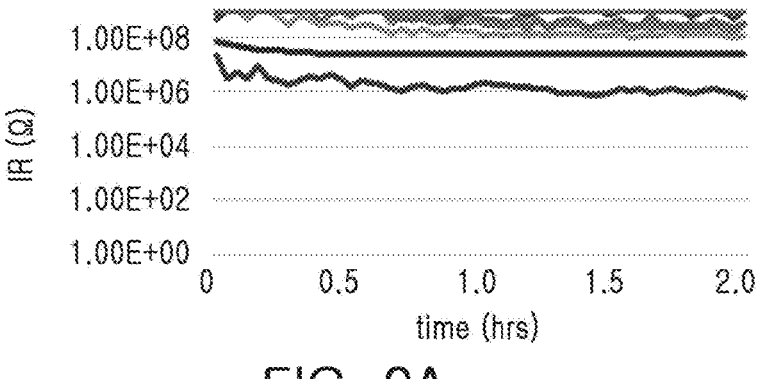
FIG. 9A is a HALT graph of the same comparative example as FIG. 8A.
Figure 9B:
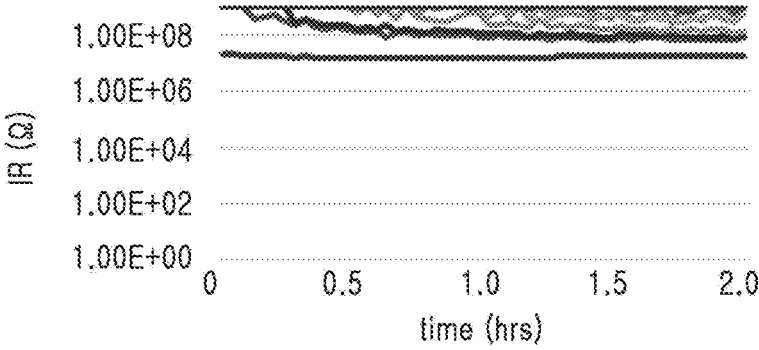
FIG. 9B is a HALT graph of the same embodiment as FIG. 8B.
Figure 9C:
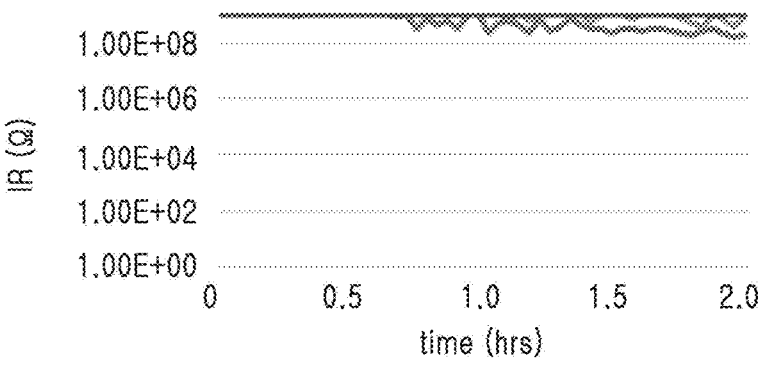
FIG. 9C is a HALT graph of the same embodiment as FIG. 8C.
Figure 10A:
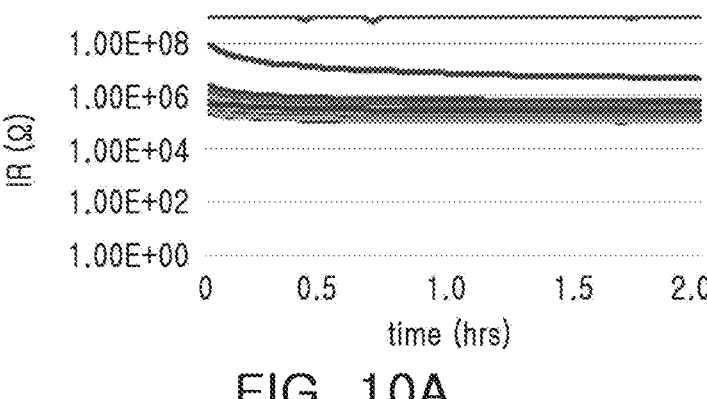
FIG. 10A is a graph of moisture resistance reliability of the comparative example same as that of FIG. 8A.
Figure 10B:
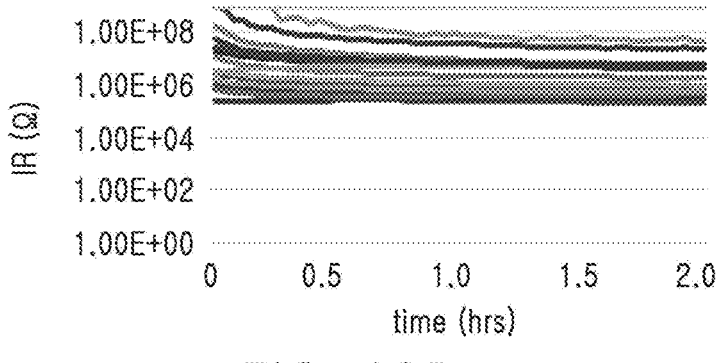
FIG. 10B is a graph of moisture resistance reliability of the same embodiment as FIG. 8B.
Figure 10C:
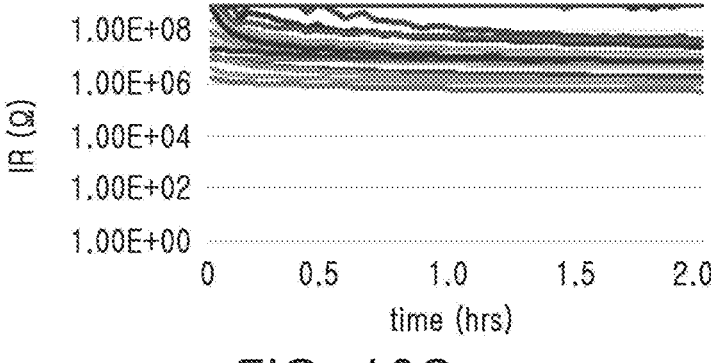
FIG. 10C is a graph of moisture resistance reliability of the same embodiment as FIG. 8C.

The HALT reliability evaluation was conducted for 2 hours under a temperature condition of 85° C. and a voltage condition of 1.2 Vr, and the results can be confirmed in the graphs of FIG. 9A-9C. The ideal target value was set when the insulation resistance value does not decrease compared to the initial insulation resistance (1.00E+09, the highest value in the graph). The case in which the insulation resistance value compared to the initial insulation resistance is 1/10 or less, for example, the case in which the insulation resistance value is 1.00E+08 or more, was evaluated as excellent, and the case in which the insulation resistance value fell to less than 1.00E+08 was evaluated as defective.

The moisture resistance reliability evaluation was conducted for 2 hours at a temperature condition of 85° C., a relative humidity of 85%, and a voltage condition of 1.0 Vr, and the results can be confirmed in the graphs of FIGS. 10A to 10C and FIG. 12. The ideal target value was set when the insulation resistance value does not decrease compared to the initial insulation resistance (1.00E+09, the highest value in the graph), and the insulation resistance value compared to the initial insulation resistance is 1/100 or less, for example, the case in which the insulation resistance value is 1.00E+06 or more was evaluated as excellent, and the case of falling to less than 1.00E+06 was evaluated as defective.

First, in Comparative Example 1 in which the Sn diffusion portion is not formed, it can be confirmed that the number of samples fell to less than 1.00E+08 in the HALT evaluation (FIG. 9A) after accelerated hydrogen charging is larger than that of the Example, and similarly, it can be seen that in the moisture resistance reliability evaluation (FIG. 10A), the number of samples falling to less than 1.00E+06 is larger than in the example.

In Comparative Example 2 containing excessive Sn, after accelerated hydrogen charging, it can be confirmed that the number of samples that fell to less than 1.00E+06 in the moisture resistance reliability evaluation (FIG. 12) is larger than that of the Example, and the sample in which insulation resistance breakdown occurred may also be checked.

On the other hand, in Example 1, it can be confirmed that there is almost no number of samples fell to less than 1.00E+08 in the HALT evaluation (FIG. 9B) after accelerated hydrogen charging, and in Example 2, it can be confirmed that there is no sample fell to less than 1.00E+08 in the HALT evaluation (FIG. 9C) after the accelerated hydrogen charging. In addition, in Example 1, it can be seen that there is almost no number of samples falling to less than 1.00E+06 in the moisture resistance reliability evaluation (FIG. 10B), and it can be confirmed that the sample has an insulation resistance value of about 1.00E+06 or more. In Example 2, it can be seen that there is almost no number of samples falling to less than 1.00E+06 in the moisture resistance reliability evaluation (FIG. 10C), and it can be seen that the sample has an insulation resistance value of about 1.00E+06 or more.

Accordingly, it can be confirmed that when the Sn diffusion portion is present, the hydrogen permeation inhibitory effect is excellent compared to the case in which the Sn diffusion portion is not present, and it can be seen that when the average number of atoms of Sn element satisfies 3% or more and 50% or less, compared to the average number of atoms of the conductive material of the internal electrode, the hydrogen permeation inhibitory effect is excellent.

As set forth above, according to an embodiment, as a Sn diffusion portion having a relatively low hydrogen diffusion coefficient is disposed in a region in which the internal electrode and the external electrode are in contact, reliability of the multilayer electronic component may be improved by preventing deterioration of insulation resistance of the internal electrode.

As the external electrode does not include the Sn diffusion portion, the reliability of the multilayer electronic component may be improved.

While example embodiments have been shown and described above, it will be apparent to those skilled in the art that modifications and variations could be made without departing from the scope of the present disclosure as defined by the appended claims.

What is claimed is:

1. A multilayer electronic component comprising:
a body including a plurality of dielectric layers and an internal electrode including a conductive material; and
an external electrode disposed on the body and connected to the internal electrode,
wherein the internal electrode includes a Sn diffusion portion including Sn in a region connected to the external electrode, and
a ratio of an average number of atoms of the Sn compared to an average number of atoms of the conductive material other than the Sn of the internal electrode included in the Sn diffusion portion is 3% or more and 50% or less.

2. The multilayer electronic component of claim 1, wherein a size of the Sn diffusion portion in an inward direction of the body from a point where the internal electrode and the external electrode are in contact is 1 µm or more and 30 µm or less.

3. The multilayer electronic component of claim 1, wherein at a point 1 µm in an inward direction of the body from a point where the internal electrode and the external electrode are in contact, the ratio of the average number of atoms of the Sn compared to the average number of atoms of the conductive material of the internal electrode included in the Sn diffusion portion is 30% or more and 50% or less.

4. The multilayer electronic component of claim 1, wherein at a point 5 µm in an inward direction of the body from a point where the internal electrode and the external electrode are in contact, the ratio of the average number of atoms of the Sn compared to the average number of atoms of the conductive material of the internal electrode included in the Sn diffusion portion is 15% or more and 30% or less.

5. The multilayer electronic component of claim 1, wherein in a region of 10 µm or more and 30 µm or less in an inward direction of the body from a point where the internal electrode and the external electrode are in contact, the ratio of the average number of atoms of the Sn compared to the average number of atoms of the conductive material of the internal electrode included in the Sn diffusion portion is 3% or more and 10% or less.

16

6. The multilayer electronic component of claim 1, wherein the ratio the average number of atoms of the Sn compared to the average number of atoms of the conductive material of the internal electrode included in the Sn diffusion portion decreases in an inward direction of the body from a point where the internal electrode and the external electrode are in contact.

7. The multilayer electronic component of claim 1, wherein the Sn diffusion portion includes the conductive material of the internal electrode and an alloy containing Sn.

8. The multilayer electronic component of claim 1, wherein the conductive material of the internal electrode includes at least one selected from the group consisting of nickel (Ni), palladium (Pd), silver (Ag), gold (Au), platinum (Pt), tungsten (W), titanium (Ti), and alloys thereof.

9. The multilayer electronic component of claim 1, wherein the conductive material includes Ni, and
a ratio of the average number of atoms of the Sn compared to an average number of atoms of the Ni in the Sn diffusion portion is 3% or more and 50% or less.

10. A multilayer electronic component comprising:
a body including a plurality of dielectric layers and an internal electrode including a conductive material; and
an external electrode disposed on the body and connected to the internal electrode,
wherein the internal electrode includes a Sn diffusion portion including Sn in a region connected to the external electrode, and
a layer of the external electrode that contacts the body does not include the Sn diffusion portion.

11. The multilayer electronic component of claim 10, wherein a ratio of an average number of atoms of the Sn compared to an average number of atoms of the conductive material other than Sn of the internal electrode included in the Sn diffusion portion is 3% or more and 50% or less.

12. The multilayer electronic component of claim 10, wherein a size of the Sn diffusion portion in an inward direction of the body from a point where the internal electrode and the external electrode are in contact is 1 µm or more and 30 µm or less.

13. The multilayer electronic component of claim 10, wherein at a point 1 µm in an inward direction of the body from a point where the internal electrode and the external electrode are in contact, a ratio of an average number of atoms of the Sn compared to an average number of atoms of the conductive material of the internal electrode included in the Sn diffusion portion is 30% or more and 50% or less.

14. The multilayer electronic component of claim 10, wherein at a point 5 µm in an inward direction of the body from a point where the internal electrode and the external electrode are in contact, a ratio of an average number of atoms of the Sn compared to an average number of atoms of the conductive material of the internal electrode included in the Sn diffusion portion is 15% or more and 30% or less.

15. The multilayer electronic component of claim 10, wherein in a region of 10 µm or more and 30 µm or less in an inward direction of the body from a point where the internal electrode and the external electrode are in contact, a ratio of an average number of atoms of the Sn compared to an average number of atoms of the conductive material of the internal electrode included in the Sn diffusion portion is 3% or more and 10% or less.

16. The multilayer electronic component of claim 10, wherein a ratio of an average number of atoms of the Sn compared to an average number of atoms of the conductive material of the internal electrode included in the Sn diffusion portion decreases in an inward direction of the body from a point where the internal electrode and the external electrode are in contact.

17. The multilayer electronic component of claim 10, wherein the Sn diffusion portion includes the conductive material of the internal electrode and an alloy containing Sn.

18. The multilayer electronic component of claim 10, wherein the conductive material of the internal electrode includes at least one selected from the group consisting of nickel (Ni), palladium (Pd), silver (Ag), gold (Au), platinum (Pt), tungsten (W), titanium (Ti), and alloys thereof.

19. The multilayer electronic component of claim 10, wherein the conductive material includes Ni, and a ratio of an average number of atoms of the Sn compared to an average number of atoms of the Ni in the Sn diffusion portion is 3% or more and 50% or less.

20. A multilayer electronic component comprising:

a body including a plurality of dielectric layers and an internal electrode including a conductive material; and an external electrode disposed on the body and connected to the internal electrode, wherein the internal electrode includes a Sn diffusion portion including Sn in a region connected to the external electrode, and an atomic ratio of the Sn to the conductive material in the Sn diffusion portion decreases in an inward direction of the body from a point where the internal electrode and the external electrode are in contact, wherein the atomic ratio of Sn to the conductive material is 30% or more at 1 μm.

21. The multilayer electronic component of claim 20, wherein a size of the Sn diffusion portion in the inward direction of the body from the point where the internal electrode and the external electrode are in contact is 1 μm or more and 30 μm or less.

22. The multilayer electronic component of claim 20, wherein a size of the Sn diffusion portion in the inward direction of the body from the point where the internal electrode and the external electrode are in contact is 5 μm or more and 30 μm or less.

23. The multilayer electronic component of claim 20, wherein a size of the Sn diffusion portion in the inward direction of the body from the point where the internal electrode and the external electrode are in contact is 10 μm or more and 30 μm or less.

24. The multilayer electronic component of claim 20, wherein the conductive material includes Ni, and an atomic ratio of the Sn to the Ni in the Sn diffusion portion is 3 at % or more and 50 at % or less.

25. The multilayer electronic component of claim 20, wherein the conductive material includes Ni, and the Sn diffusion portion includes an alloy of Ni and Sn.

* * * * *